March 28, 1944.  V. G. GARNETT ET AL  2,345,192
INDEPENDENTLY MOVABLE DUAL WHEEL CONSTRUCTION FOR VEHICLES
Filed May 27, 1940  3 Sheets-Sheet 1

INVENTORS.
EDWARD V. GARNETT.
BY VACTOR G. GARNETT.

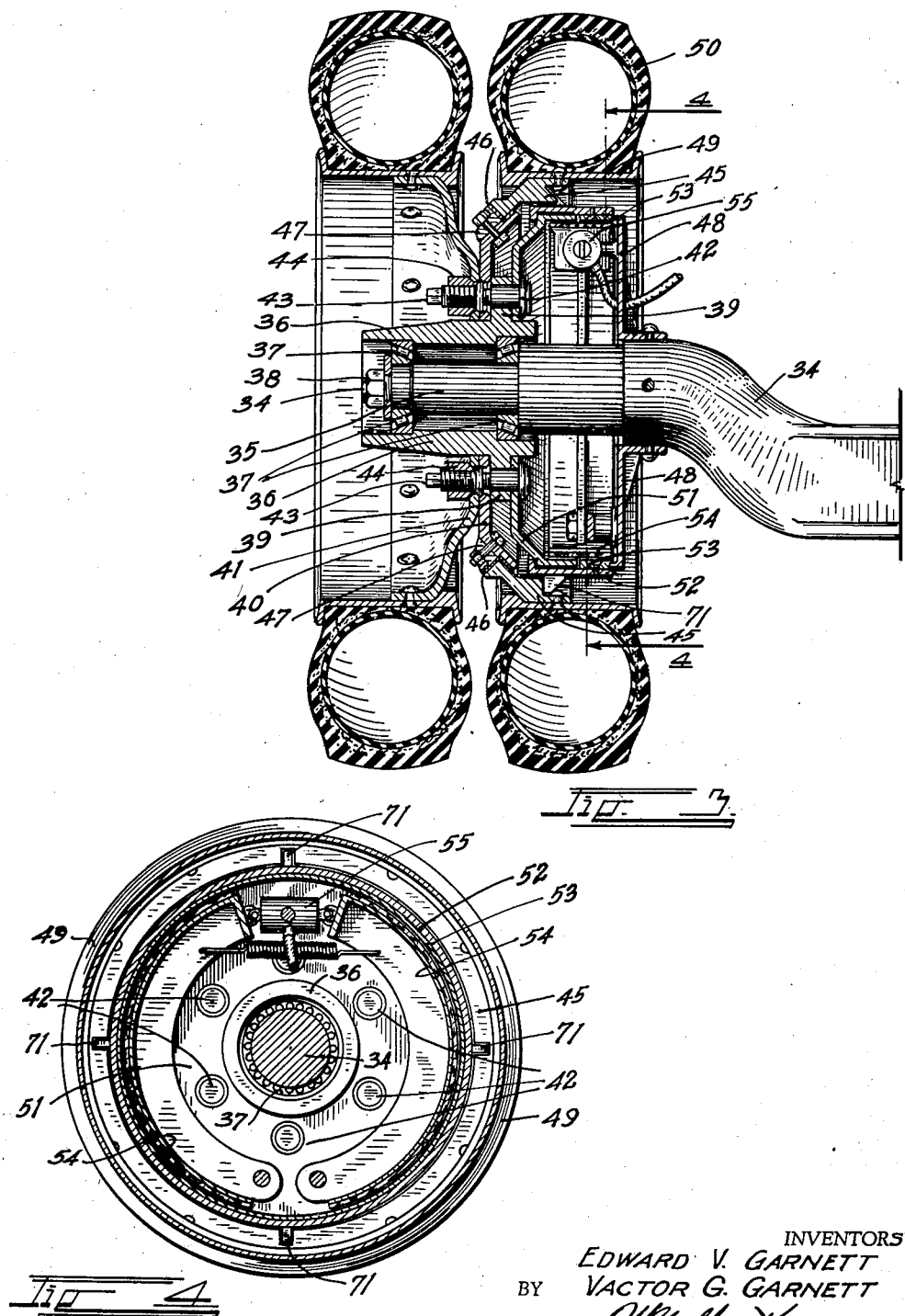

March 28, 1944. V. G. GARNETT ET AL 2,345,192
INDEPENDENTLY MOVABLE DUAL WHEEL CONSTRUCTION FOR VEHICLES
Filed May 27, 1940 3 Sheets-Sheet 3
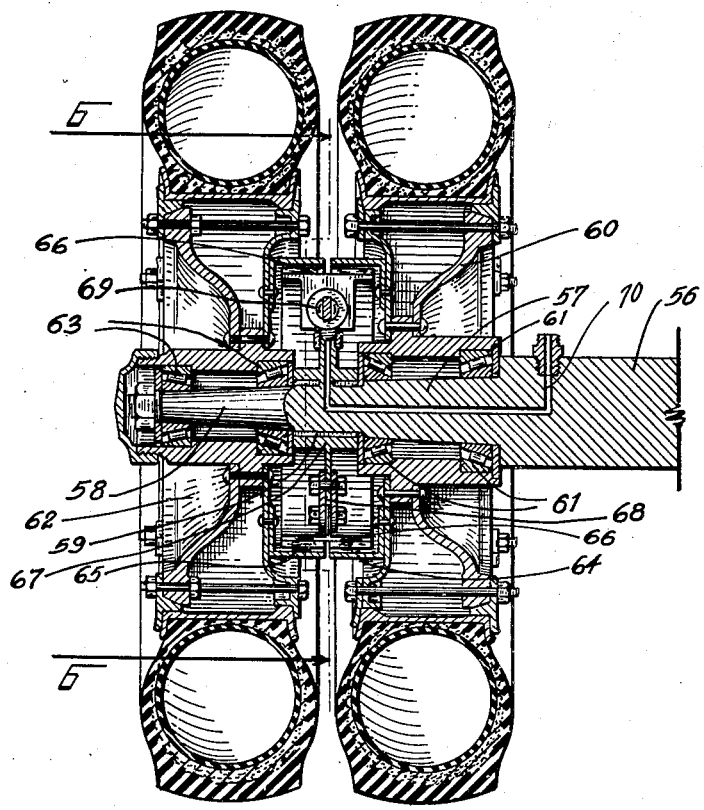
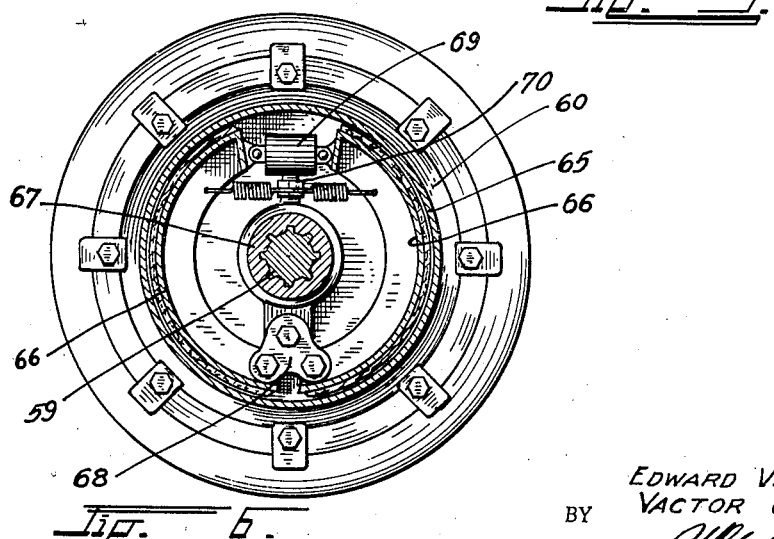
INVENTORS.
EDWARD V. GARNETT.
VACTOR G. GARNETT.
BY Patented Mar. 28, 1944

2,345,192

UNITED STATES PATENT OFFICE 2,345,192

INDEPENDENTLY MOVABLE DUAL WHEEL CONSTRUCTION FOR VEHICLES

Vactor G. Garnett and Edward V. Garnett, Denver, Colo.

Application May 27, 1940, Serial No. 337,482

1 Claim. (Cl. 188—18)

This invention relates to a dual wheel construction for vehicles.

In the usual dual wheel construction, two wheels with independent tires are locked together as an integral wheel unit, without any allowance for differential movement between the wheels. Naturally, in rounding curves and in traveling on the side of highly crowned pavements one of the dual wheels endeavors to travel at a higher rate of speed than the other. Since the wheels are locked together as a unit, however, they must rotate at the same speed and any differential in travel distance is taken up in tire friction on the road. As a result, the tires of dual wheels wear away rapidly.

This objection to dual wheels has been recently recognized and attempts have been made to correct the trouble with use of differential gears and clutches between the wheels. Such constructions have been exceedingly heavy and exceedingly expensive and have introduced braking problems that have not as yet been satisfactorily solved. If a brake is applied to one wheel of a pair connected together differentially by gears, the braking effect will be entirely neutralized if the other wheel does not have perfect traction and a differential movement will be introduced in the wheels resulting in unusual tire wear. If the wheels are independent of each other and the brake is applied to the inner wheel only, the braking effect of the outer wheel tends to reduce the tractive braking effect of the inner wheel.

The principal object of this invention is to provide a practical and efficient dual wheel construction in which the two wheels of the pan will roll entirely independent of each other at all times and in which a single braking element will act similarly and equally on both wheels of the pair without introducing differential braking strains.

While the invention is more particularly applicable to trailer wheels, another object of the invention is to provide an independently movable dual wheel construction which can be applied to the front or steering dual wheels of a vehicle; and in which a single set of brake shoes will act simultaneously against a braking drum on each of the wheels of a pair of dual wheels.

Other objects of the invention are to provide a device of this character, which will allow easy access to either wheel of a pair or to either tire for repair or replacement purposes; which will allow easy access to the brake shoes and drums for replacement or repairs; in which the loads of each wheel will be centralized over the bearings for that wheel; and in which the load imposed by the steering pivot, in the case of steering wheels, will be centralized over the bearings of both wheels of the pair to eliminate all cantilever actions and bending stresses.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 3 is a vertical section through a pair of dual wheels illustrating the principle of the invention applied in an alternate way.

Fig. 4 is a cross section, taken on the line 4—4, Fig. 3 with the tires omitted.

Fig. 5 is a vertical section through a pair of dual wheels showing an alternate form of the invention.

Fig. 6 is a cross section, taken on the line 6—6, Fig. 5.

First form

Figure 1:
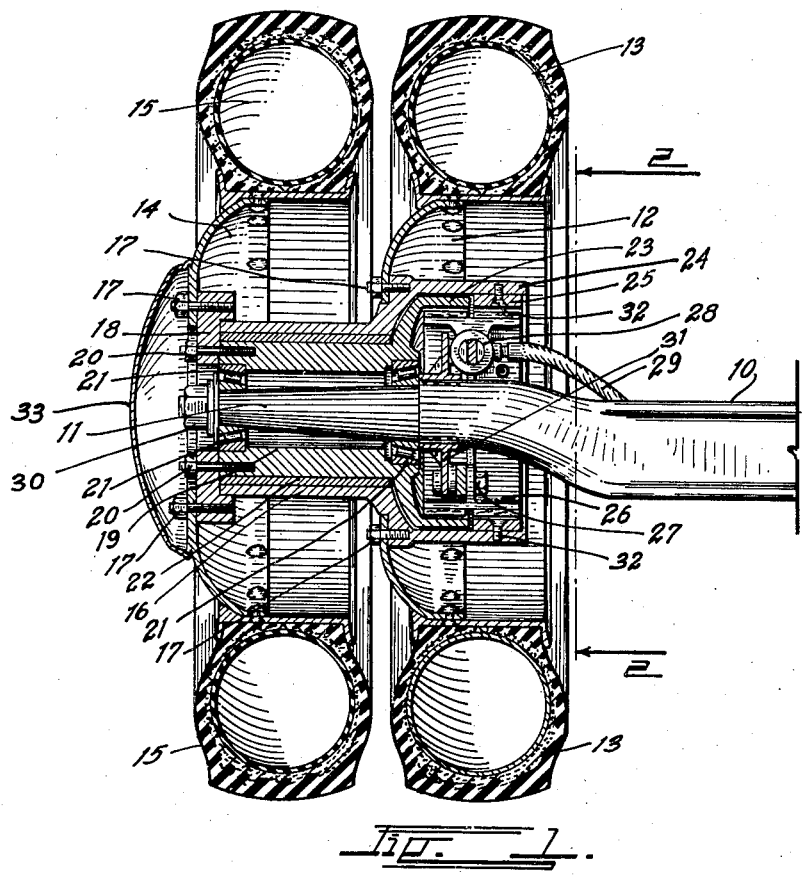
Fig. 1 is a vertical section through a pair of dual wheels with the principles of the invention applied thereto.
Figure 2:
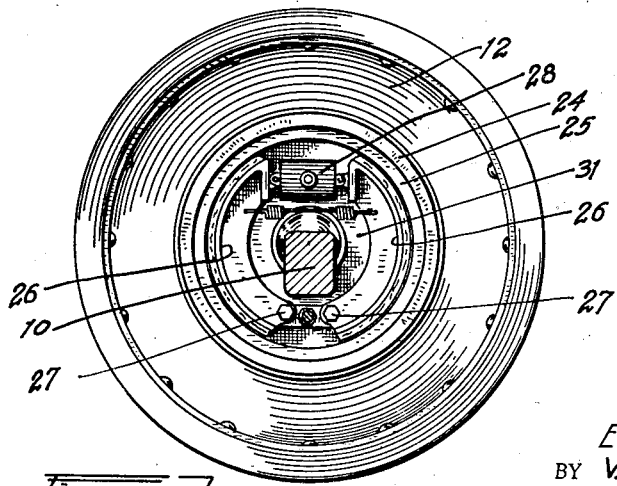
Fig. 2 is a cross section, taken on the line 2—2, Fig. 1 illustrating an inner face view of the wheels with the tires removed therefrom.

In Fig. 1 a vehicle axle is indicated at 10 with its tapered bearing extremity at 11. The inner dual wheel is illustrated at 12 with its tire at 13 and the outer dual wheel at 14 with its tire at 15.

The inner wheel is secured to a flange on an outer thimble 16 by means of the usual wheel bolts 17. The outer wheel is secured to a removable wheel ring 18 by means of the usual wheel bolts 17. The wheel ring is secured upon an inner thimble 19 by means of suitable cap screws 20. The inner thimble is journalled upon the axle spindle on suitable frictionless bearings 21 and is held in place thereon by means of an axle nut 30.

The outer thimble is rotatably mounted on a bearing bushing 22 of bronze or other suitable bearing metal. The wheel ring 18 prevents endwise movement of the outer thimble on the inner thimble.

Thus it can be readily seen that both wheels are free to rotate on the axle on the bearings 21 and that either wheel can rotate differentially of the other on the bearing bushing 22. Thus the first desirable requirement of independently rolling dual wheels is met.

The braking is accomplished by expanding the inner thimble 19 to form an inner brake drum 23. The outer thimble 16 is expanded over the inner brake drum to form an outer brake drum 24 which extends inwardly beyond the inner brake drum 23. A drum band 25 is secured within the outer brake drum, by means of suitable screws 32, which acts as a continuation of the inner drum and brings the internal surfaces of both into flush cylindrical alignment.

The braking is accomplished on both the inner drum and the drum band 25 of the outer drum simultaneously by means of brake shoes 26 having a width equal to the total width of the internal surfaces of the inner drum and band. The brake shoes may be of any desired type. As illustrated they are typical hydraulically operated shoes supported from a brake disc 31 secured to the axle. The shoes are pivoted at 27 at their one extremities and expanded at their other extremities by means of a brake fluid tube 29.

It can be readily seen that any variations in speed between the two wheels is taken up by relative movement on the bronze bearing bushing 22 and that when the brake is applied, it will resist rotation of both wheels equally.

By removing the nuts 20, the outer wheel and its wheel band may be easily removed. The inner wheel can then be removed by removing the nuts 17. The brake elements are easily accessible from the inside face of the inner wheel. The entire inner wheel and thimble assembly can be easily removed by simply detaching the drum band 25 by removing the screws 32. The outer wheel nuts are concealed and protected by means of a standard hub cap 33.

Second form

A second form of the invention is illustrated in Figs. 3 and 4 which also employs a single set of brake shoes acting against a braking surface on each of the dual wheels.

In this form an axle is indicated at 34 with its wheel spindle at 35. A hub member 36 is journalled on wheel bearings 37 on the spindle and is held thereon by means of an axle nut 34. The hub member is formed with a wheel flange 39 against which an inner wheel 40 and an outer wheel 41 are bolted on bolts 42 having inner nuts 43 for holding the inner wheel in place and outer nuts 44 threaded onto the inner nuts for holding the outer wheel in place thereon.

A rim ring 45 surrounds the inner wheel 40 and is rotatably mounted thereon in a V-shaped, annular bearing bushing 46 which is held to the wheel by means of a removable clamping ring 47. The rim ring 45 is attached to a wheel rim 49 which carries a tire 50 for the inner wheel 40.

It can be readily seen that the two wheels are free to rotate at different relative speeds. The differential being accommodated by movement on the annular V-shaped bushing 46.

The braking is accomplished by securing a brake drum 51 to the hub flange 39 by means of the bolts 42 or in any other desired manner. A second brake drum 52 is rotatably mounted about the first brake drum so as to project inwardly beyond the inner face thereof. A brake band 53 is secured within the second drum with its inner surface in alignment with the inner surface of the first brake drum. The second brake drum is provided with projecting keys 71 which engage in receiving notches in the rim ring 45. Therefore, the drum 51 moves with the outer wheel 41 and the drum 52 and its band 53 move with the inner wheel 40.

The inner surfaces of both the inner drum and the band 53 are simultaneously engaged by a set of brake shoes 54 of sufficient width to simultaneously engage both. The shoes 54 and their hydraulic actuating cylinder 55 are carried by a stationary brake disc 48 secured to the axle 34.

When the brake shoes are applied an equal braking action is therefor applied to both wheels yet when rolling each wheel may rotate independently of the other.

Third form

A third embodiment of the invention is illustrated in Figs. 5 and 6 having the independently rolling wheels and the independent brake drums coacting with a single set of brake shoes. In this form the braking mechanism is mounted between the wheels of the dual pair.

In this construction of the invention an axle 56 having an inner spindle 57 and an outer spindle 58 separated by a splined portion 59 is employed. An inner wheel 60 is mounted on bearings 61 on the inner spindle and an outer wheel 62 is mounted on bearings 63 on the outer spindle.

The inner wheel 60 is provided with a brake drum 64 in its outer face and the outer wheel 62 is provided with a similar brake drum 65 on its inner face. The two brake drums face each other in axially aligned, spaced relation and form an enclosing brake housing.

Within the brake drums is a single set of expanding brake shoes 66. The brake shoes are mounted upon a brake supporting sleeve 67 which is drilled and formed with key slots to fit over the splined portion 59 of the axle so that it will be held against rotation thereon. The shoes may be actuated by any desired mechanism. As illustrated, they are pivoted at their one extremities on an equalizer member 68 mounted on an arm extending from the brake supporting sleeve 67. The other extremities of the brake shoes are separated by a hydraulic brake cylinder 69 also carried from the sleeve 67. The brake fluid is supplied to the cylinder through a fluid passage 70 in the axle 56.

The action of this form is similar to the previously described forms. Both wheels roll independently and both are retracted by the same brake shoes. In this form, however, both wheels are journalled directly on the axle. Access may be had to the brake mechanism by simply removing the outer wheel. The entire brake assembly slides from place with the removal of the inner wheel.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:

A dual wheel mounting for vehicles comprising, in combination: an inner wheel bearing on, and adjacent the extremity of, said axle; an outer wheel bearing on said axle at the extremity thereof; an inner wheel mounted on the inner wheel bearing; an outer wheel mounted on the outer wheel bearing; a brake supporting structure mounted on said axle between said two bearings; a brake drum on the adjacent face of each wheel in cylindrical alignment with, and facing, each other to form a brake enclosure; braking means carried by said brake supporting structure for exerting a braking action against both brake drums simultaneously, said brake supporting member being slidable from the extremity of said shaft, and acting to maintain the inner wheel bearing in place, said outer wheel bearing contacting said supporting member to maintain the latter in place; means for preventing rotation of the brake supporting member; and means on the extremity of the shaft for retaining the outer wheel bearing in place thereon.

VACTOR G. GARNETT.
EDWARD V. GARNETT.